(12) United States Patent
Tomita et al.

(10) Patent No.: US 10,484,103 B2
(45) Date of Patent: Nov. 19, 2019

(54) TRANSCEIVER FOR COMMUNICATION AND METHOD FOR CONTROLLING COMMUNICATION

(71) Applicant: Cypress Semiconductor Corporation, San Jose, CA (US)

(72) Inventors: Kazuhiro Tomita, Kasugai (JP); Masuo Inui, Aichi (JP)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/392,405

(22) Filed: Apr. 23, 2019

(65) Prior Publication Data

US 2019/0327005 A1 Oct. 24, 2019

Related U.S. Application Data

(63) Continuation of application No. 16/045,460, filed on Jul. 25, 2018, now Pat. No. 10,361,793, which is a
(Continued)

(51) Int. Cl.
*H04B 15/02* (2006.01)
*H04L 7/00* (2006.01)
(Continued)

(52) U.S. Cl.
CPC ........... *H04B 15/02* (2013.01); *H04B 1/3822* (2013.01); *H04B 15/005* (2013.01);
(Continued)

(58) Field of Classification Search
CPC .... H04B 15/02; H04B 1/3822; H04B 15/005; H04L 7/0012; H04L 7/0037; H04L 12/40006; H04L 25/4902; H04L 25/4906
See application file for complete search history.

(56) References Cited

U.S. PATENT DOCUMENTS 5,436,897 A * 7/1995 Cook .................. H04L 25/4902
340/12.16
5,604,918 A * 2/1997 Huijsing ............. G06F 13/4226
710/72
(Continued)

FOREIGN PATENT DOCUMENTS

TW 230808 B 9/1994
WO 2015011864 A1 1/2015
WO 2015174736 A1 11/2015

OTHER PUBLICATIONS

International Search Report for International Application No. PCT/US17/20787 dated Mar. 31, 2017; 4 pages.
(Continued)

*Primary Examiner* — Freshteh N Aghdam

(57) ABSTRACT

An example embodiment provides a transceiver for communication includes a timing determiner that detects a fall from high level to low level of a bus signal generated by pulse width modulation of a clock signal and input from a communication bus; a transmission data signal delay adjuster that determines a second timing having a predetermined time difference from a first timing, the bus signal rising from the low level to the high level at the first timing; an encoder that extends a low level of the bus signal by changing a data signal to be output to the communication bus from high level to low level; and a timing adjustment circuit that changes the data signal to the low level at the second timing.

20 Claims, 18 Drawing Sheets

Related U.S. Application Data continuation of application No. 15/449,558, filed on Mar. 3, 2017, now Pat. No. 10,063,325, which is a continuation of application No. 15/198,928, filed on Jun. 30, 2016, now Pat. No. 9,705,697.

(60) Provisional application No. 62/307,925, filed on Mar. 14, 2016.

(51) Int. Cl.
| | | |
|---|---|---|
| *H04B 15/00* | (2006.01) | |
| *H04L 25/49* | (2006.01) | |
| *H04L 12/40* | (2006.01) | |
| *H04B 1/3822* | (2015.01) | |

(52) U.S. Cl.
CPC .......... *H04L 7/0012* (2013.01); *H04L 7/0037* (2013.01); *H04L 12/40006* (2013.01); *H04L 25/4902* (2013.01); *H04L 25/4906* (2013.01)

(56) References Cited

U.S. PATENT DOCUMENTS

| | | | |
|---|---|---|---|
| 6,842,108 B2 | 1/2005 | Akiyama et al. | |
| 8,396,003 B2 | 3/2013 | Leinonen et al. | |
| 9,197,100 B2 | 11/2015 | Ichikawa | |
| 2006/0112293 A1* | 5/2006 | Przybysz | H03M 9/00 |
| | | | 713/400 |
| 2006/0140114 A1 | 6/2006 | Cochran | |
| 2009/0168800 A1 | 7/2009 | Leinonen et al. | |
| 2012/0026863 A1* | 2/2012 | Cochran | H04L 1/24 |
| | | | 370/212 |
| 2012/0153894 A1 | 6/2012 | Widmer | |
| 2013/0062724 A1 | 3/2013 | Tokuyama et al. | |
| 2013/0163688 A1* | 6/2013 | Calvin | G01D 21/00 |
| | | | 375/272 |
| 2014/0320262 A1 | 10/2014 | Park | |
| 2016/0066886 A1 | 3/2016 | Kantor et al. | |

OTHER PUBLICATIONS

JPO Office Action for Application No. 2017-038662 dated May 6, 2019; 4 pages.
Polfliet, Jan, et al., "Understanding the LIN PHY (physical) layer", EE Times, dated Jan. 28, 2008; 5 pages.
SIPO Office Action for Application No. 201710211884.9 dated May 24, 2018; 5 pages.
USPTO Final Rejection for U.S. Appl. No. 15/449,558 dated Sep. 20, 2017; 8 pages.
USPTO Non-Final Rejection for U.S. Appl. No. 15/198,928 dated Sep. 12, 2016; 5 pages.
USPTO Non-Final Rejection for U.S. Appl. No. 15/449,558 dated May 31, 2017; 9 pages.
USPTO Notice of Allowance for U.S. Appl. No. 15/198,928 dated Feb. 27, 2017; 8 pages.
USPTO Notice of Allowance for U.S. Appl. No. 15/198,928 dated Nov. 10, 2016; 7 pages.
USPTO Notice of Allowance for U.S. Appl. No. 15/449,558 dated Jan. 5, 2018; 8 pages.
USPTO Notice of Allowance for U.S. Appl. No. 15/449,558 dated Apr. 30, 2018; 8 pages.
USPTO Notice of Allowance for U.S. Appl. No. 16/045,460 dated Jan. 24, 2019; 11 pages.
Written Opinion of the International Searching Authority for International Application No. PCT/US17/20787 dated Mar. 31, 2017; 3 pages.

* cited by examiner

TRANSCEIVER FOR COMMUNICATION AND METHOD FOR CONTROLLING COMMUNICATION

PRIORITY

This application is a continuation application of U.S. Non-Provisional application Ser. No. 16/045,460, filed on Jul. 25, 2018, which is a continuation of U.S. Non-Provisional application Ser. No. 15/449,558, filed on Mar. 3, 2017, now U.S. Pat. No. 10,063,325, issued on Aug. 28, 2018 which is a continuation of U.S. Non-Provisional application Ser. No. 15/198,928, filed on Jun. 30, 2016, now U.S. Pat. No. 9,705,697, issued on Jul. 11, 2017, which claims the priority and benefit of U.S. Provisional Application No. 62/307,925, filed on Mar. 14, 2016, the entire contents of which are incorporated by reference herein in their entirety.

TECHNICAL FIELD

This disclosure relates to a transceiver for communication and a method for controlling communication.

BACKGROUND

In an apparatus provided with a plurality of electronically controllable devices, communication is performed between processors that individually control the devices. For example, a vehicle such as an automobile is provided with an air conditioner, door mirrors, power windows, wipers, and other electronically controllable devices. A plurality of Electronic Control Units (ECU) that electronically control these devices are mounted in the vehicle. These ECUs are connected to each other by a bus and communicate according to a predetermined communication protocol.

During communication between the ECUs, noise might be emitted by wiring in the bus that connects the ECUs. The emitted noise might affect other devices depending on the frequency band.

SUMMARY

It would therefore be helpful to provide a transceiver for communication and a method for controlling communication that can reduce the effect of noise.

To this end, a transceiver for communication according to one aspect of this disclosure includes a timing determiner configured to detect a fall from high level to low level of a bus signal generated by pulse width modulation of a clock signal and input from a communication bus; a transmission data signal delay adjuster configured to determine a second timing having a predetermined time difference from a first timing, the bus signal rising from the low level to the high level at the first timing; an encoder configured to extend a low level of the bus signal by changing a data signal to be output to the communication bus from high level to low level; and a timing adjustment circuit configured to change the data signal to the low level at the second timing.

In the above aspect, the transmission data signal delay adjuster may calculate the predetermined time difference with Equation (1) below:

$$t_{diff}=(2n-1)/(2f_{notch}) \quad (1)$$

where $t_{diff}$ is the predetermined time difference, $f_{notch}$ is a frequency at which a harmonic level is reduced, and n is a natural number.

The above aspect may further include a clock rise start detector configured to detect a start of rising from the low level of the bus signal; and a clock rise start determiner configured to determine the first timing based on a timing of the start of rising of the bus signal from the low level detected by the clock rise start detector.

The above aspect may further include a first comparator configured to compare a signal level of the bus signal with a first reference voltage; a second comparator configured to compare the signal level with a second reference voltage different from the first reference voltage; and a clock rise start determiner configured to determine a timing of a start of rising from the low level of the bus signal based on a comparison result from the first comparator and the second comparator.

In the above aspect, the transmission data signal delay adjuster may determine the second timing to be after the fall of the bus signal.

The above aspect may further include a first comparator configured to compare a signal level of the bus signal with a first reference voltage; a second comparator configured to compare the signal level with a second reference voltage different from the first reference voltage; and a clock fall end determiner configured to determine a timing of the fall of the bus signal based on a comparison result from the first comparator and the second comparator.

In the above aspect, the transmission data signal delay adjuster may determine the second timing to be earlier than a timing of a start of rising from the low level of the bus signal.

In the above aspect, the transmission data signal delay adjuster may determine a timing of a start of rising from the low level to the high level of the data signal to be a predetermined length of time after a timing of the fall of the bus signal.

In the above aspect, the transceiver for communication may be included in a node used in Clock Extension Peripheral Interface (CXPI) communication.

In the above aspect, the transceiver for communication may function as a slave node transceiver communicating with a master node transceiver over the communication bus (e.g., such as a CXPI bus).

According to another aspect of this disclosure, a method is provided for controlling communication by a transceiver that communicates over a communication bus, the method including: detecting a fall from high level to low level of a bus signal generated by pulse width modulation of a clock signal and input from the communication bus; determining a second timing having a predetermined time difference from a first timing, the bus signal rising from the low level to the high level at the first timing; extending a low level of the bus signal by changing a data signal to be output to the communication bus from high level to low level; and changing the data signal to the low level at the second timing.

In the above aspect, the predetermined time difference may be calculated with Equation (2) below:

$$t_{diff}=(2n-1)/(2f_{notch}) \quad (2)$$

where $t_{diff}$ is the predetermined time difference, $f_{notch}$ is a frequency at which a harmonic level is reduced, and n is a natural number.

The above aspect may further include detecting by a clock rise start detector a start of rising from the low level of the bus signal; and determining the first timing based on a timing of the bus signal detected by the clock rise start detector.

In the above aspect, the transceiver for communication may include a first comparator and a second comparator, and the above aspect may further include: the first comparator comparing a signal level of the bus signal with a first reference voltage; the second comparator comparing the signal level with a second reference voltage different from the first reference voltage; and determining a timing of a start of rising from the low level of the bus signal based on a comparison result from the first comparator and the second comparator.

The above aspect may further include determining the second timing to be after the fall of the bus signal.

In the above aspect, the transceiver for communication may include a first comparator and a second comparator, and the above aspect may further include: the first comparator comparing a signal level of the bus signal with a first reference voltage; the second comparator comparing the signal level with a second reference voltage different from the first reference voltage; and determining a timing of the fall of the bus signal based on a comparison result from the first comparator and the second comparator.

The above aspect may further include determining the second timing to be earlier than a timing of a start of rising from the low level of the bus signal.

The above aspect may further include determining a timing of a start of rising from the low level to the high level of the data signal to be a predetermined length of time after a timing of the fall of the bus signal.

In the above aspect, the transceiver for communication may be included in a node used in Clock Extension Peripheral Interface (CXPI) communication.

In the above aspect, the transceiver for communication may function as a slave node transceiver communicating with a master node transceiver over the communication bus (e.g., such as CXPI bus).

The transceiver for communication and the method for controlling communication of the embodiments below can reduce the effect of noise.

DETAILED DESCRIPTION

Examples of communication protocols used between ECUs mounted in an automobile include a Local Interconnect Network (LIN), a Controller Area Network (CAN), and a Clock Extension Peripheral Interface (CXPI).

Figure 14:
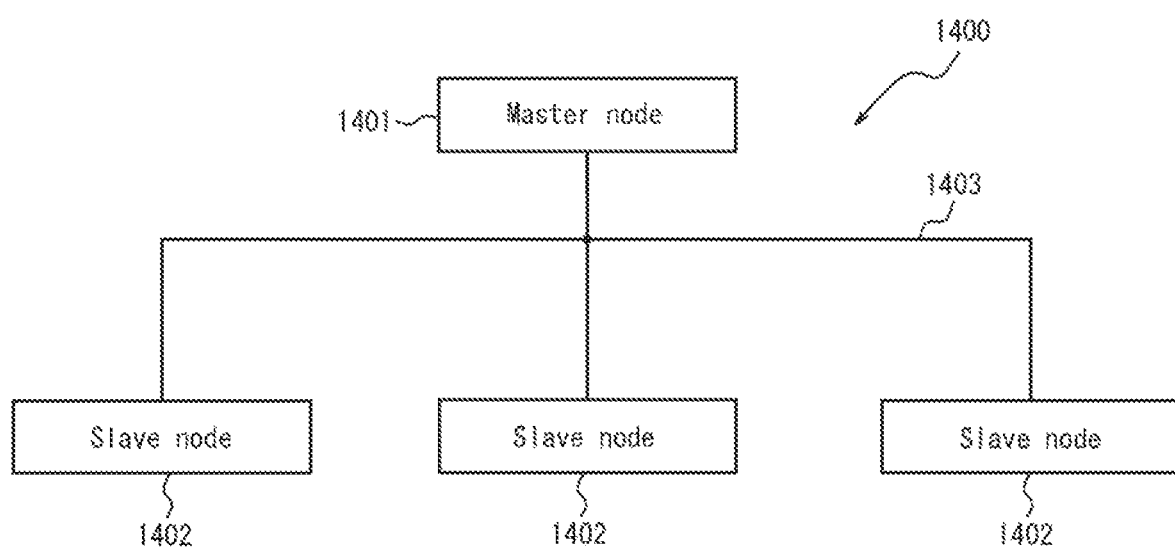
FIG. 14 illustrates an example of the system structure in CXPI communication.

As illustrated by the example in FIG. 14, a communication system 1400 that performs CXPI communication includes one master node 1401 and a plurality of slave nodes 1402. FIG. 14 illustrates an example with three slave nodes 1402. The master node 1401 is connected to each slave node 1402 by a communication bus 1403. The master node 1401 and the slave nodes 1402 are, for example, each configured with a computer, computing device, or the like.

The master node 1401 is a node that controls the operation timing of each slave node 1402. The master node 1401 transmits a bus signal mBUS (see FIG. 15), which becomes the reference for communication, at a constant frequency to the communication bus 1403. The slave nodes 1402 transmit and receive data with the bus signal mBUS transmitted by the master node 1401 as a reference clock.

Figure 15:
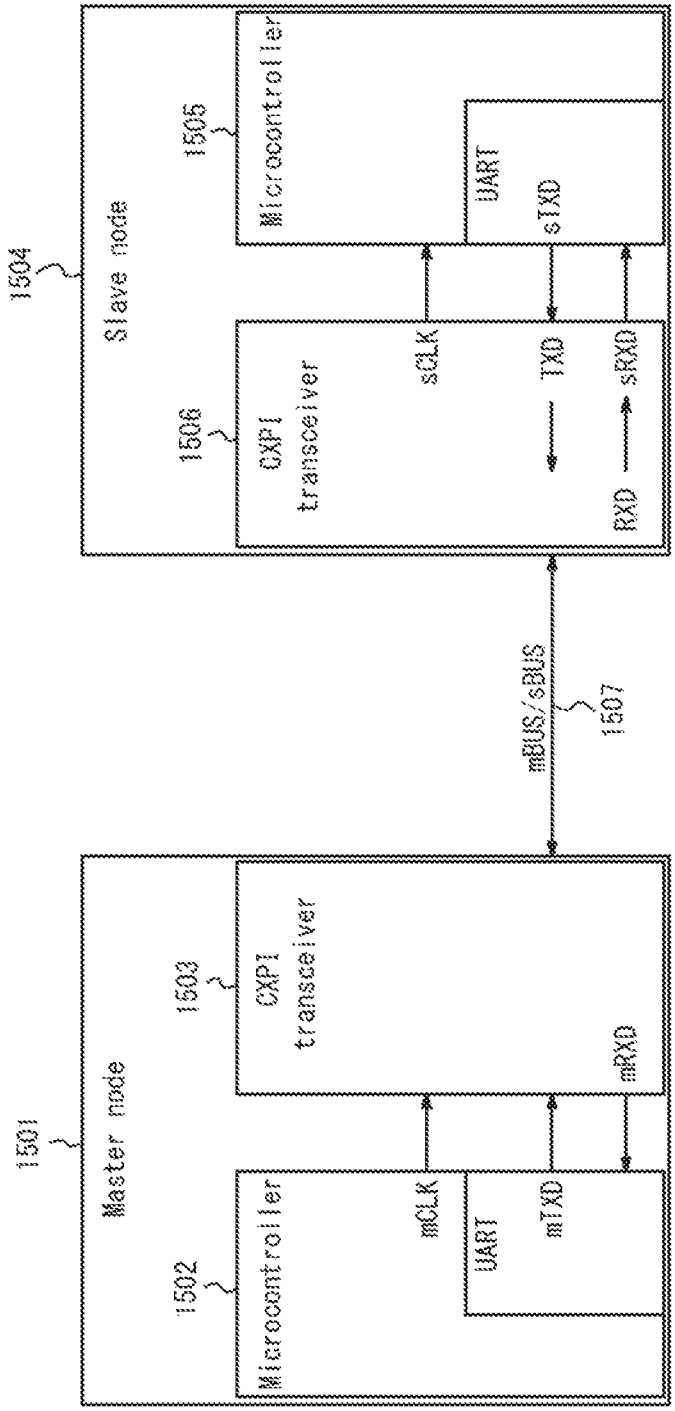
FIG. 15 illustrates an example of the circuit structure in a CXPI communication system.

FIG. 15 illustrates an example of the circuit structure in a CXPI communication system. FIG. 15 only illustrates one slave node 1504 in order to simplify the illustration. A master node 1501 includes a microcontroller 1502 and a CXPI transceiver 1503. The slave node 1504 includes a microcontroller 1505 and a CXPI transceiver 1506. The microcontrollers 1502 and 1505 each include a Universal Asynchronous Receiver Transmitter (UART) interface and each transmit and receive signals to and from the CXPI transceivers 1503 and 1506.

Figure 16:
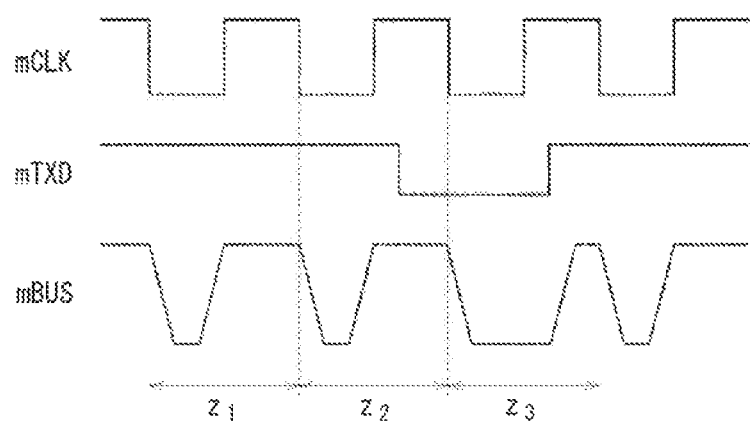
FIG. 16 illustrates an example of the waveform for the master node in a CXPI communication system.

In CXPI communication, the master node 1501 transmits data by subjecting the clock signal mCLK to Pulse Width Modulation (PWM). FIG. 16 illustrates an example of the waveform for the master node in a CXPI communication system. FIG. 16 illustrates the clock signal mCLK output from the microcontroller 1502 to the CXPI transceiver 1503, a data signal mTXD output from the microcontroller 1502 to the CXPI transceiver 1503, and the bus signal mBUS output by the CXPI transceiver 1503 to a communication bus 1507.

Figure 17:
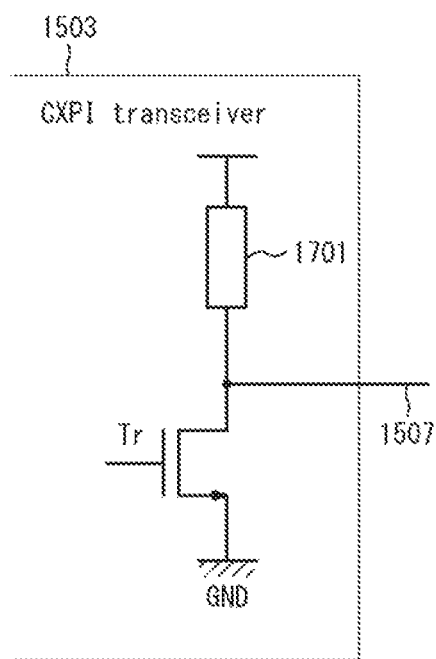
FIG. 17 illustrates a portion of the circuit within the CXPI transceiver of the master node in FIG. 15.

A CXPI transceiver 1503 performs PWM on the clock signal mCLK to generate a signal exhibiting a logical value corresponding to the data signal mTXD. The bus signal mBUS generated by performing PWM on the clock signal mCLK is transmitted to the slave node 1504, thereby transmitting data from the master node 1501 to the slave node 1504. The bus signal mBUS has two voltage levels (high level and low level). The high level and the low level of the bus signal mBUS are generated by a circuit such as the one illustrated in FIG. 17 and are output to the communication bus 1507. The high level of the bus signal mBUS is determined by a pull-up resistor 1701 connected to a power line. The low level of the bus signal mBUS is generated by an output terminal to the communication bus 1507 being connected to a ground GND via a transistor Tr controlled by the data signal mTXD being input.

In CXPI communication, the logical value of the bus signal mBUS output to the communication bus 1507 is determined by the length of the low level (or the high level) of the bus signal mBUS. When the duration of the low level of the bus signal mBUS is shorter than a predetermined time, for example in the intervals $Z_1$ and $Z_2$ in FIG. 16, the logical value of the bus signal mBUS is 1. When the duration of the low level of the bus signal mBUS is longer than a predetermined time, for example in the interval $Z_3$ in FIG. 16, the logical value of the bus signal mBUS is 0.

The CXPI transceiver 1503 performs PWM on the clock signal mCLK so that the bus signal mBUS exhibits a logical value of 1 when the data signal mTXD is at a high level, as shown in the intervals $Z_1$ and $Z_2$ in FIG. 16. Conversely, by extending the duration of the low level of the bus signal mBUS, the CXPI transceiver 1503 performs PWM on the clock signal mCLK so that the bus signal mBUS exhibits a logical value of 0 when the data signal mTXD is at a low level, as shown in the interval $Z_3$ in FIG. 16. In this way, the CXPI transceiver 1503 transmits data by controlling the logical value of the bus signal mBUS based on the data signal mTXD.

The CXPI transceiver 1503 receives a bus signal sBUS transmitted by the slave node 1504 from the communication bus 1507 and transmits a data signal obtained by decoding the bus signal sBUS to the microcontroller 1502 as a received signal mRXD.

The slave node 1504 transmits data by combining the bus signal sBUS with the bus signal mBUS output by the master node 1501 to generate the bus signal BUS. At the timing at which the slave node 1504 outputs data, the master node 1501 does not transmit data but rather transmits the bus signal mBUS at a constant duty cycle and receives the bus signal sBUS transmitted by the slave node 1504 from the communication bus 1507. At the timing at which the slave node 1504 outputs data, the bus signal mBUS output by the master node 1501 is a signal with a logical value of 1. In other words, when the slave node 1504 does not output the bus signal sBUS, the bus signal BUS exhibits a logical value of 1. When outputting the bus signal sBUS, the slave node 1504 configures the bus signal sBUS so that the logical value of the combined bus signal BUS will be 0. By the slave node 1504 thus determining the logical value of the combined bus signal BUS based on the bus signal sBUS, data can be transmitted to the master node 1501 that acquires the bus signal BUS.

Figure 18:
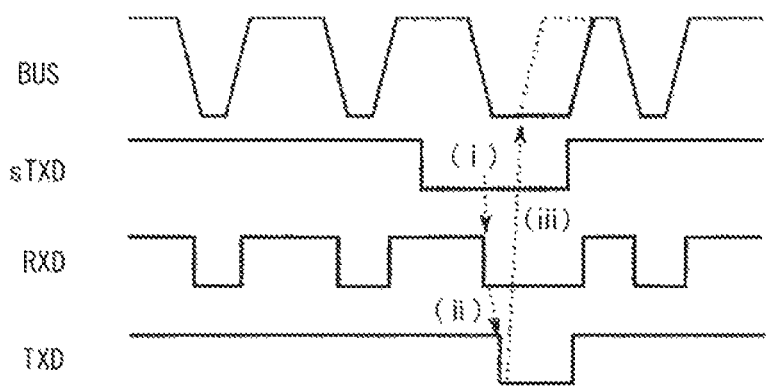
FIG. 18 illustrates an example of the waveform for the slave node in a CXPI communication system.

FIG. 18 illustrates an example of the waveform for the slave node in the CXPI communication system. FIG. 18 illustrates a bus signal BUS that is a combination of the bus signal sBUS output from the slave node 1504 (CXPI transceiver 1506) and the bus signal mBUS output from the master node 1501, a data signal sTXD output by the microcontroller 1505, a received data signal RXD acquired by the CXPI transceiver 1506 from the bus signal mBUS, and a transmission data signal TXD transmitted by the CXPI transceiver 1506 to the communication bus 1507.

The slave node 1504 receives the bus signal mBUS output from the master node 1501 via the communication bus 1507 and operates. The CXPI transceiver 1506 acquires the clock signal sCLK from the bus signal mBUS acquired from the communication bus 1507 and outputs the clock signal sCLK to the microcontroller 1505.

When transmitting data to the communication bus 1507, the slave node 1504 notifies other nodes of the start of data transmission by driving the bus signal mBUS acquired from the master node 1501. Transmission of data by the slave node 1504 is now described. The CXPI transceiver 1506 detects a fall in the bus signal mBUS by a change (fall) in the received data signal RXD, which is generated by a circuit inside the CXPI transceiver 1506 and the logical value of which changes in accordance with behavior of the bus signal mBUS ((i) in FIG. 18). Upon detecting a fall in the bus signal mBUS by a fall in the received data signal RXD, the CXPI transceiver 1506 controls the logical value of the transmission data signal TXD generated in a circuit inside the CXPI transceiver 1506 to be 0 based on the data signal sTXD output by the microcontroller 1505 ((ii) in FIG. 18). Upon the transmission data signal TXD being input into the communication bus 1507, the voltage of the bus signal sBUS drops to the low level while the logical value of the transmission data signal TXD is 0. Therefore, the duration of low level of the bus signal BUS that is the combination of the bus signal mBUS and the bus signal sBUS is extended ((iii) in FIG. 18). In this way, by the low level of the bus signal BUS being extended, the master node 1501 can receive a bus signal BUS with an extended low level, thereby detecting the start of data transmission from the slave node 1504 to the master node 1501 and starting to receive data.

Figure 19:
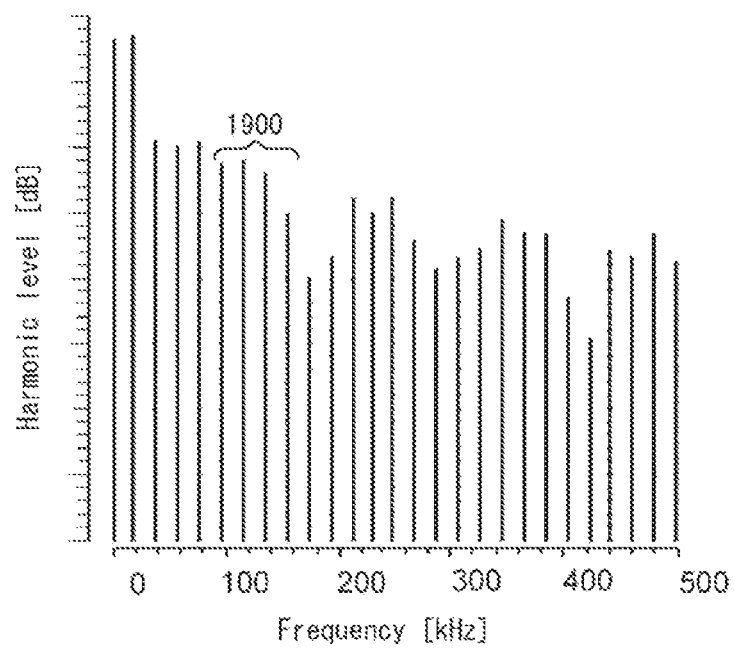
FIG. 19 illustrates an example of the spectrum of noise generated in a CXPI communication system.

As described above, when communication is performed between the master node 1501 and the slave node 1504, noise may be emitted from the communication bus 1507 by transmission and reception of signals. The noise emitted from the communication bus 1507 may affect other communication. For example, a smart key system is affected by noise. A smart key system is a system whereby a key that the user possesses locks and unlocks doors of the automobile by wireless communication with the automobile. For example, when using a 19.2 kHz signal as the reference clock in CXPI communication and using a 134 kHz signal in the smart key system, 134 kHz is the 7$^{th}$ harmonic of 19.2 kHz. Therefore, as illustrated in FIG. 19, the harmonic level around 134 kHz (100 kHz to 160 kHz) indicated by region 1900 in the noise frequency spectrum increases. As a result, wireless communication of the smart key system may be blocked by CXPI communication.

If an attempt is made to suppress emission of noise by performing control to reduce the slew rate of the bus signal mBUS and to make the bus signal mBUS rise and fall more gradually, then when the slave node 1504 transmits data, the fall of the bus signal sBUS input into the communication bus 1507 needs to be somewhat steeper for signal accuracy. On the other hand, if the fall of the bus signal sBUS is too steep, conduction noise is generated due to the change in the current flowing in the communication bus 1507. The conduction noise generated in the communication bus 1507 and the reason why the fall of the bus signal sBUS should not be made too gradual are now described with respect to FIG. 20, FIG. 21, FIG. 22, and FIG. 23.

Figure 20:
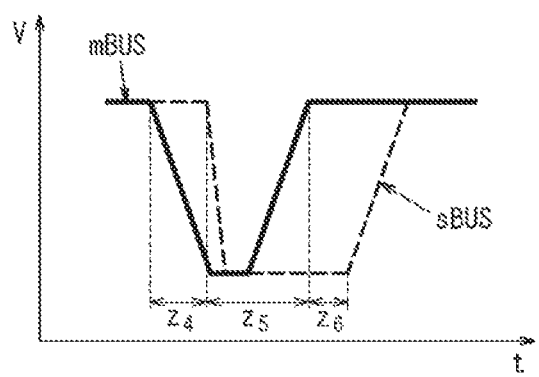
FIG. 20 illustrates an example of voltage on the communication bus.
Figure 21:
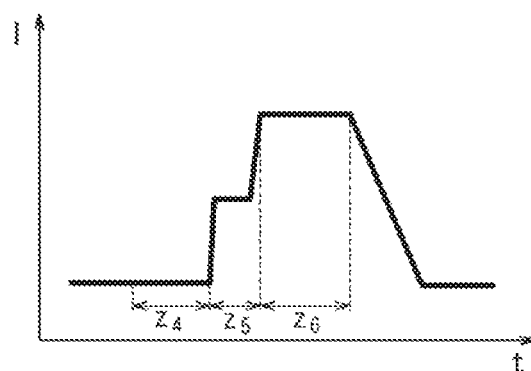
FIG. 21 illustrates an example of current flowing in the communication bus.
Figure 22:
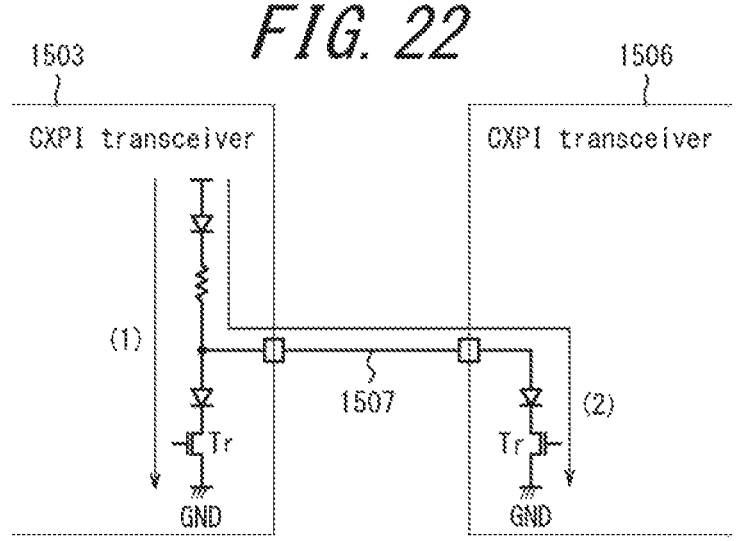
FIG. 22 schematically illustrates an example of current flow in the communication bus.

FIG. 20 illustrates an example of a voltage signal on the communication bus 1507, and FIG. 21 illustrates an example of current flowing in the communication bus 1507. FIG. 22 schematically illustrates an example of current flow in the communication bus 1507.

When the bus signal sBUS from the slave node 1504 is not input to the communication bus 1507 and the bus signal mBUS from the master node 1501 is falling (interval $Z_4$ in FIG. 20 and FIG. 21), the current flows from the pull-up resistor side to the transistor Tr side in the CXPI transceiver 1503 as illustrated in (1) of FIG. 22, without flowing to the communication bus 1507.

As described with reference to FIG. 18, the slave node 1504 sets the voltage level of the bus signal sBUS on the communication bus 1507 to a low level. Therefore, upon inputting the transmission data signal TXD to the communication bus 1507 (interval $Z_5$ in FIG. 20 and FIG. 21), the current flows in the CXPI transceiver 1503 as indicated by (1) of FIG. 22 and also flows to the CXPI transceiver 1506 as indicated by (2). In other words, at this time, current flows in the communication bus 1507. When transitioning in this way from interval $Z_4$ to interval $Z_5$, conduction noise is generated due to the change in the current. The bus signal sBUS input to the communication bus 1507 at this time has a steeper inclination at the falling edge than the falling edge of the bus signal mBUS output from the master node 1501, as illustrated in FIG. 20. Therefore, a sudden change in current occurs.

Furthermore, when the bus signal mBUS output by the master node 1501 is high level and the voltage level of the bus signal sBUS output from the slave node 1504 is maintained at low level (interval $Z_6$ in FIG. 20 and FIG. 21), the current stops flowing to the transistor Tr side of the CXPI transceiver 1503, and as indicated by (2) in FIG. 22, all of the current flows from the pull-up resistor side of the CXPI transceiver 1503 to the CXPI transceiver 1506. Accordingly, the current flowing in the communication bus 1507 changes (increases) when transitioning from interval $Z_5$ to interval $Z_6$ as well, and conduction noise is therefore generated due to the change in the current.

Figure 23:
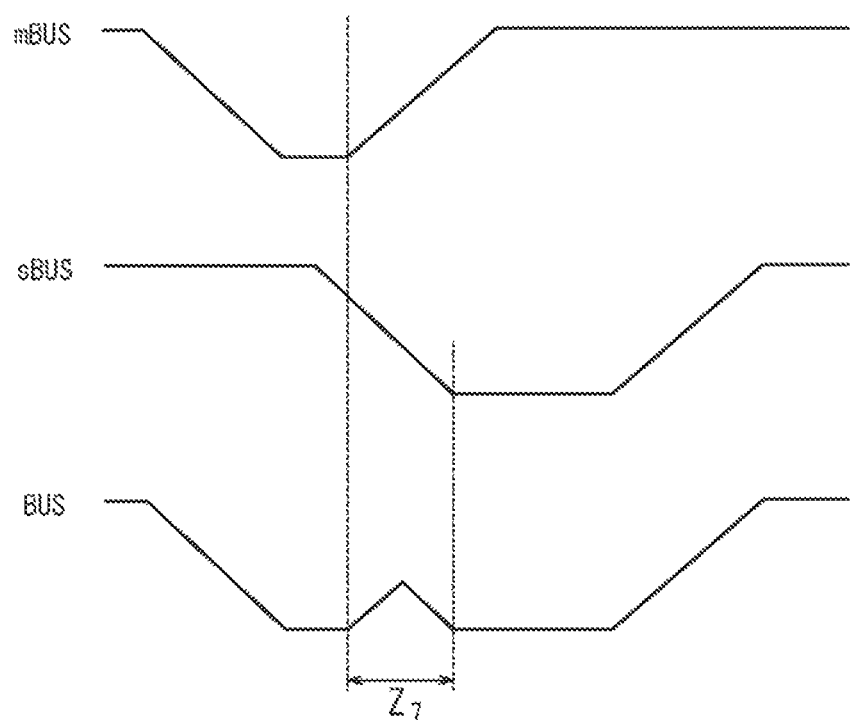
FIG. 23 illustrates an example of the case when the inclination of the fall is set to be identical in the bus signal output by the master node and the bus signal output by the slave node.

FIG. 23 illustrates an example of the case when the inclination of the fall is set to be identical in the bus signal mBUS output by the master node 1501 and the bus signal sBUS output by the slave node 1504. When the inclination of the fall of the bus signal sBUS output from the slave node 1504 is gradual, then in the bus signal BUS, which is a combination of the bus signal mBUS from the master node 1501 and the bus signal sBUS from the slave node 1504 and which flows in the communication bus 1507, an interval $Z_7$ may occur, in which the signal level rises and falls in correspondence with the rise of the bus signal mBUS from the master node 1501 and the fall of the bus signal sBUS from the slave node 1504. If an interval $Z_7$ occurs in which the signal level rises and falls in this way, communication between the master node 1501 and the slave node 1504 becomes unstable. Therefore, in order to prevent such an interval $Z_7$ from occurring, the fall of the bus signal sBUS output from the slave node 1504 should have a certain degree of steepness.

On the other hand, upon making the fall of the bus signal sBUS output from the slave node 1504 steep, conduction noise occurs as described above, which may for example block wireless communication in a smart key system or the like.

An embodiment for reducing the effect of the aforementioned conduction noise is described below with reference to the drawings.

Figure 1:
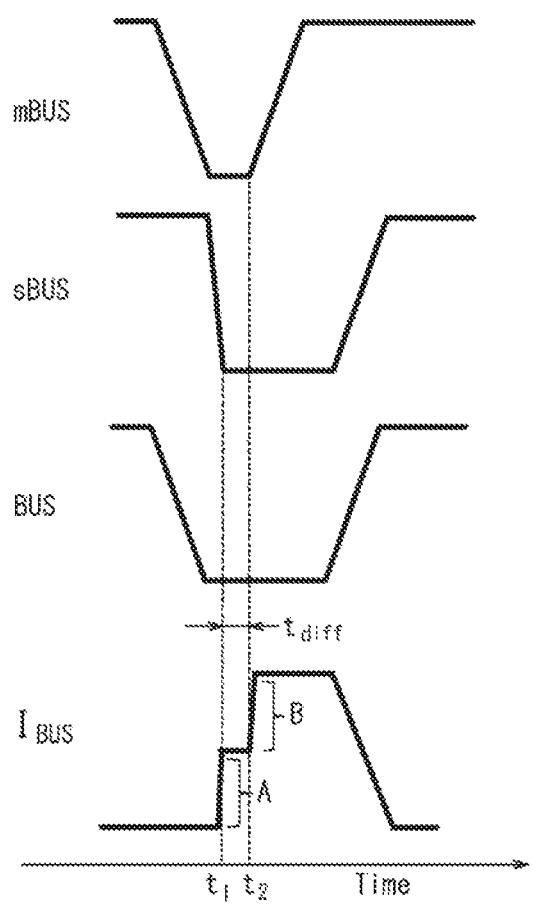
FIG. 1 illustrates the relationship between control by a slave node and current flowing in the communication bus.

First, the principle in this embodiment behind reducing the effect of conduction noise is described with reference to FIG. 1. FIG. 1 illustrates the relationship between control by a slave node and current flowing in the communication bus. FIG. 1 illustrates a bus signal mBUS output by the master node 1501, a bus signal sBUS output by the slave node 1504, a bus signal BUS that is a combination of the bus signal mBUS and the bus signal sBUS, and the current $I_{BUS}$ flowing in the communication bus 1507. In FIG. 1, time $t_1$ indicates the point in time at which the logical value of the bus signal sBUS from the slave node 1504 reaches 0 (slave fall end), and time $t_2$ indicates the point in time at which the bus signal mBUS from the master node 1501 starts to be displaced from the low level to the high level (clock rise start).

As described with reference to FIGS. 20 to 22, the current $I_{BUS}$ flowing in the communication bus 1507 changes due to the operations when the slave node 1504 transmits data. In FIG. 1, section A indicates the change in the current $I_{BU}S$ due to the transition from interval $Z_4$ to interval $Z_5$ in FIGS. 20 and 21, and section B indicates the change in the current $I_{BUS}$ due to the transition from interval $Z_5$ to interval $Z_6$ in FIGS. 20 and 21.

When a time difference $t_{diff}$ is a predetermined length, where $t_{diff}$ is the difference between time $t_2$ and time $t_1$, then in a specific frequency band, a component of the current spectrum in section A and a component of the current spectrum in section B are canceled due to a phase relationship. In other words, in the components of the spectrum at each frequency band for section A and section B, the components of the frequency band for which the phase difference is $\pi$ radians (or an odd multiple of $\pi$ radians) cancel each other.

The relationship between the time difference $t_{diff}$ and the frequency $f_{notch}$ that is cancelled is now described in detail.

The phase difference $\Delta\phi$ in the frequency components of section A and section B at a predetermined frequency f is represented by Equation (3) below.

$$\Delta\phi = 2\pi \cdot t_{diff} \cdot f \quad (3)$$

In order for the components of section A and section B at frequency $f_{notch}$ to be canceled, it suffices for the phase difference $\Delta\phi$ to be an odd multiple of $\pi$ radians. In other words, it suffices for Equation (4) to hold, where n is a natural number.

$$2\pi \cdot t_{diff} \cdot f_{notch} = (2n-1)\pi \quad (4)$$

Solving Equation (4) for $f_{notch}$ and $t_{diff}$ yields Equation (5) and Equation (6) below.

$$f_{notch} = (2n-1)/(2t_{diff}) \quad (5)$$

$$t_{diff} = (2n-1)/(2f_{notch}) \quad (6)$$

Accordingly, by controlling the time difference $t_{diff}$ to be the value calculated by substituting the frequency $f_{notch}$ at which the spectrum components are cancelled into Equation (6) above, the effect of the harmonic at the frequency $f_{notch}$ can be reduced.

Figure 2:
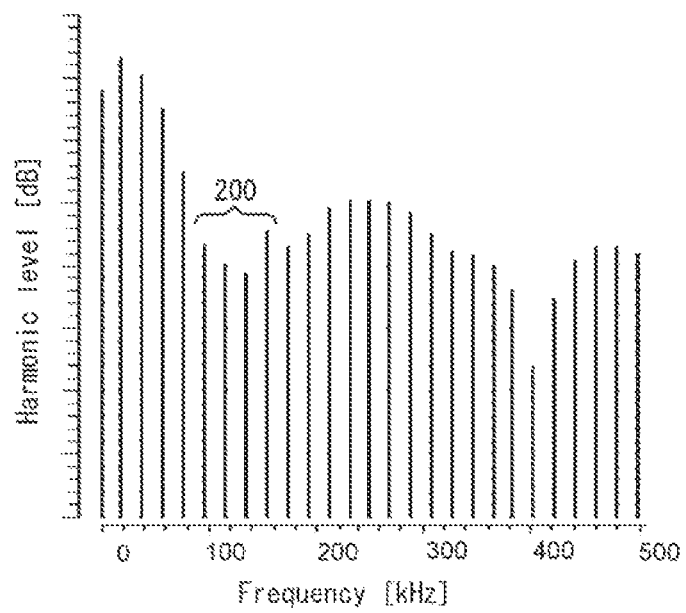
FIG. 2 illustrates an example of the spectrum of harmonic levels when executing control according to one of the disclosed embodiments.

FIG. 2 illustrates an example of the frequency spectrum of harmonic levels when executing control according to this embodiment. FIG. 2 illustrates the frequency spectrum of harmonic levels when the time difference $t_{diff}$ is controlled to be the value calculated from Equation (6) with $f_{notch}$=134 kHz. As illustrated in FIG. 2, the harmonic level near $f_{notch}$=134 kHz indicated in the region 200 is reduced as compared to FIG. 19. As a result, the effect of conduction noise at the frequency band near $f_{notch}$ can be reduced. In the example illustrated in FIG. 2, the case of $f_{notch}$=134 kHz has been described, but in other frequency bands as well, the harmonic level in the frequency band can be lowered by controlling the time difference $t_{diff}$ to be the value calculated by Equation (6). As the difference in height (i.e. the fluctuation range of the current) between section A and section B is smaller, the effect of the reduction in the harmonic level increases.

Figure 3:
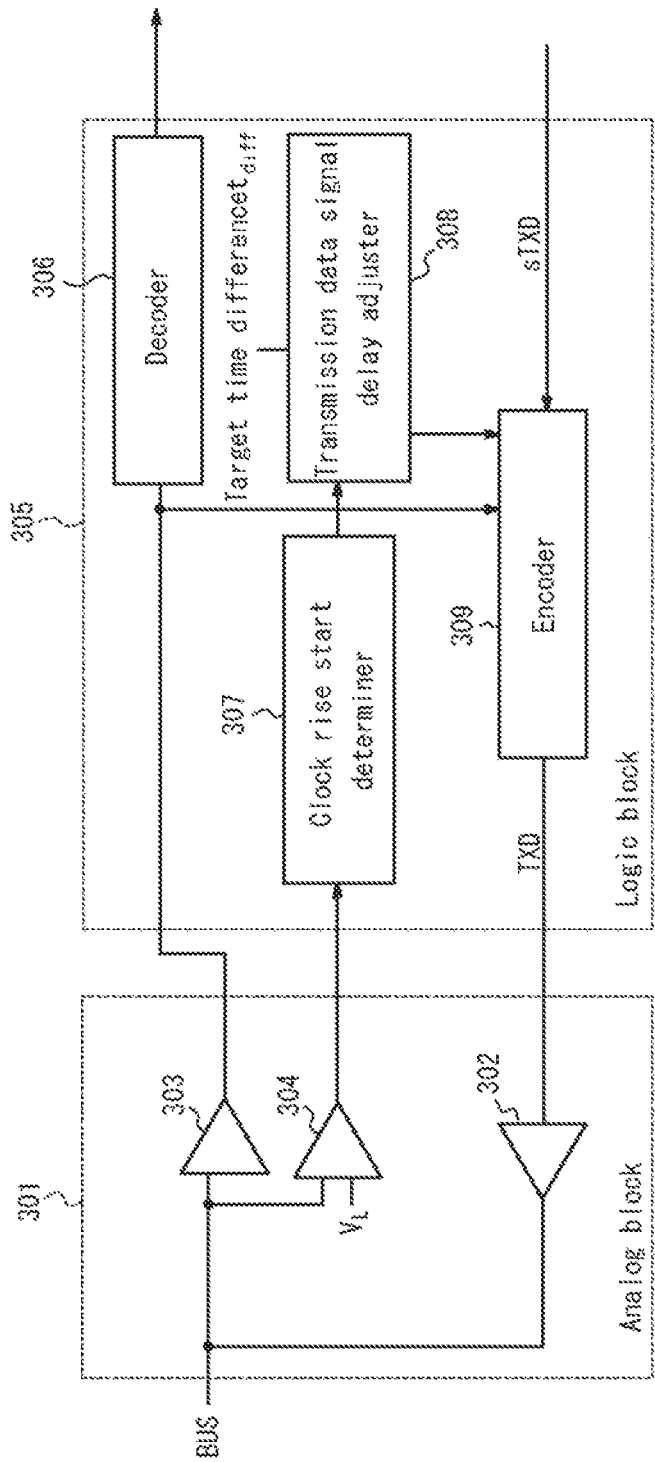
FIG. 3 is a block diagram illustrating an example of a transceiver for communication according to this embodiment.

FIG. 3 is a block diagram illustrating an example of a slave node transceiver for communication (CXPI transceiver 1506), according to this embodiment, which can reduce the above-described harmonic level. The CXPI transceiver 1506 includes an analog block 301 and a logic block 305.

The analog block 301 includes a driver 302, a receiver 303, and a clock rise start detector 304. The driver 302 inputs the transmission data signal TXD from the microcontroller 1505, acquired via the logic block 305, into the communication bus 1507. The receiver 303 acquires the bus signal mBUS input from the communication bus 1507 connected to the analog block 301 and transmits the bus signal mBUS to the logic block 305.

The clock rise start detector 304 is a circuit that detects the point in time at which the clock signal starts to be displaced from the low level to the high level, i.e. the time $t_2$. The clock rise start detector 304 is, for example, configured with a comparator. When the clock rise start detector 304 is configured with a comparator, for example the low level voltage $V_L$ of the bus signal mBUS and the bus signal mBUS are input into the clock rise start detector 304. The clock rise start detector 304 compares the voltage $V_L$ with the voltage of the bus signal mBUS that are input and outputs a signal representing the comparison result.

The logic block 305 includes a decoder 306, a clock rise start determiner 307, a transmission data signal delay adjuster 308, and an encoder 309. The decoder 306 transmits the result of decoding the signal acquired from the receiver 303 to the microcontroller 1505.

Based on the timing of the clock rise start acquired from the clock rise start detector 304, the clock rise start determiner 307 determines the time $t_2$ at which the bus signal mBUS starts to be displaced from the low level. Based on the time $t_2$ acquired from the clock rise start determiner 307 and on the target time difference $t_{diff}$, the transmission data signal delay adjuster 308 determines the timing for inputting the transmission data signal TXD, i.e. the timing for lowering the bus signal sBUS from the slave node 1504.

The encoder 309 converts the data signal sTXD acquired from the microcontroller 1505 to a PWM signal and inputs the transmission data signal TXD to the driver 302. At this time, the encoder 309 inputs the transmission data signal TXD to the driver 302 at a predetermined timing based on the timing for inputting the transmission data signal TXD determined by the transmission data signal delay adjuster 308.

Figure 4:
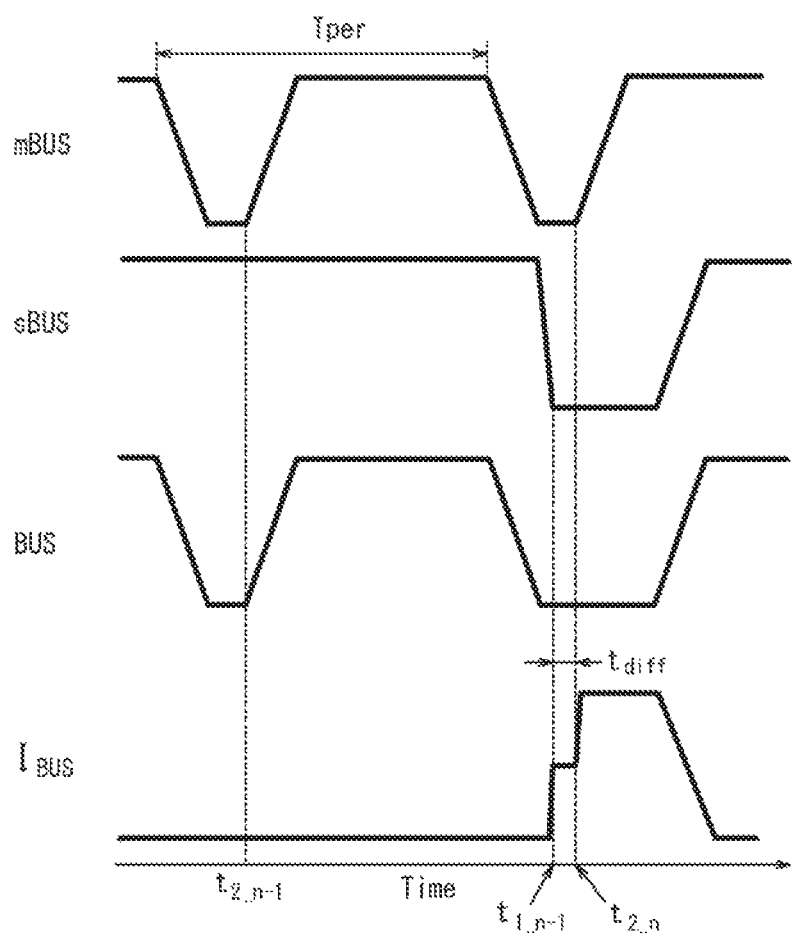
FIG. 4 illustrates an example of controlling a transmission data signal with the transceiver for communication according to this embodiment.

With reference to FIG. 4, the following describes control by the CXPI transceiver 1506 described with reference to FIG. 3. Like FIG. 1, FIG. 4 illustrates a bus signal mBUS output by the master node 1501, a bus signal sBUS output by the slave node 1504, a bus signal BUS that is a combination of the bus signal mBUS and the bus signal sBUS, and the current $I_{BUS}$ flowing in the communication bus 1507. Here, an example of the case of the CXPI transceiver 1506 outputting the bus signal sBUS by transmitting the transmission data signal TXD at the $n^{th}$ clock cycle is described.

First, with the clock rise start detector 304, the CXPI transceiver 1506 detects the time $t_{2\_n-1}$ of the clock rise start at the $(n-1)^{th}$ cycle that is one cycle before the $n^{th}$ cycle. With the clock rise start determiner 307, the CXPI transceiver 1506 also determines, based on the period $T_{per}$ of the bus signal mBUS, the time $t_{2\_n}=t_{2\_n-1}+T_{per}$ of the $n^{th}$ clock rise start from the detected time $t_{2\_n-1}$. Note that the CXPI transceiver 1506 need not detect the time $t_{2\_n-1}$ if the time $t_{2\_n}$ of the $n^{th}$ clock rise start can be calculated. For example, the CXPI transceiver 1506 may calculate the time $t_{2\_n}$ based on the time $t_{2\_n-m}$ of the $(n-m)^{th}$ clock rise start (where n>m).

The CXPI transceiver 1506 subtracts the time difference $t_{diff}$ from the time $t_{2\_n}$ with the transmission data signal delay adjuster 308, thereby calculating the time at which the logical value of the bus signal sBUS became 0, i.e. the time $t_{1\_n}$ of the slave fall end. The CXPI transceiver 1506 modulates the bus signal sBUS with logical value 0 to a PWM signal so that the time $t_{1\_n}$ becomes the slave fall end of the bus signal sBUS.

In this way, by the CXPI transceiver 1506 controlling the timing of control of the bus signal sBUS, the harmonic level at a predetermined frequency $f_{notch}$ can be reduced.

Next, a modification to the CXPI transceiver 1506 of this embodiment is described. The modification described here is an example that can control the timing of the below-described slave fall end and the fall end (clock fall end) of the bus signal mBUS.

Figure 5:
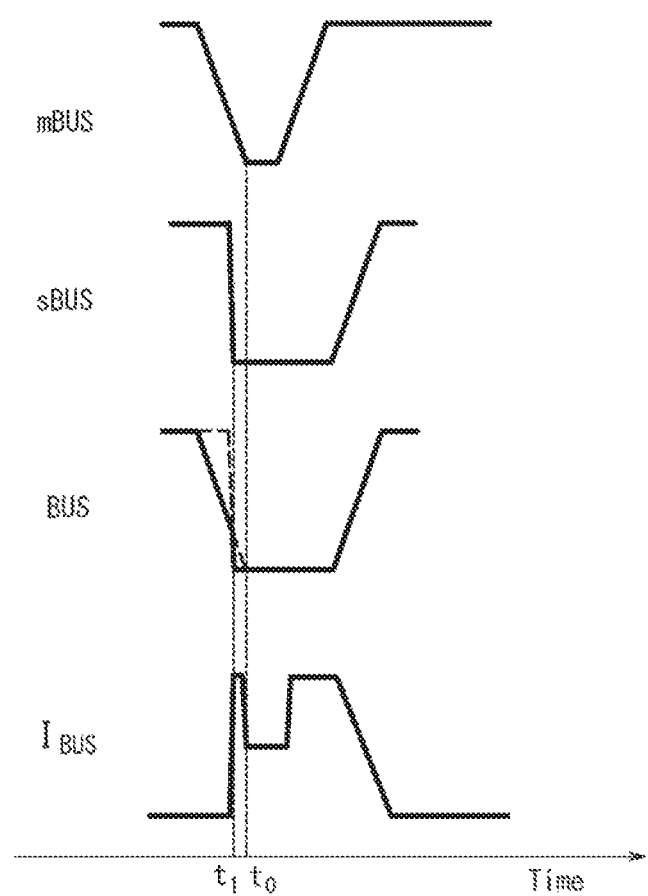
FIG. 5 illustrates the change in current of the communication bus when the slave fall end is sooner than the clock fall end.

FIG. 5 illustrates the change in current of the communication bus when the slave fall end is sooner than the clock fall end. As illustrated in FIG. 5, when the time $t_1$ of the slave fall end of the bus signal sBUS is earlier than the time $t_0$ of the clock fall end of the bus signal mBUS, then from the time $t_1$ to the time $t_0$, all of the current flows from the pull-up resistor side of the master node 1501 to the slave node 1504 via the communication bus 1507. Therefore, a change in the current $I_{BUS}$ of the communication bus 1507 occurs. Conduction noise is generated due to this change in current $I_{BUS}$. The amount of change in the current $I_{BUS}$ at this time is the total of the amount of change in section A and section B in FIG. 1. Therefore, the effect on conduction noise at this time increases more in comparison to section A and section B in FIG. 1. Accordingly, the time $t_1$ of the slave fall end should preferably be later than the time $t_0$ of clock fall end.

Figure 6:
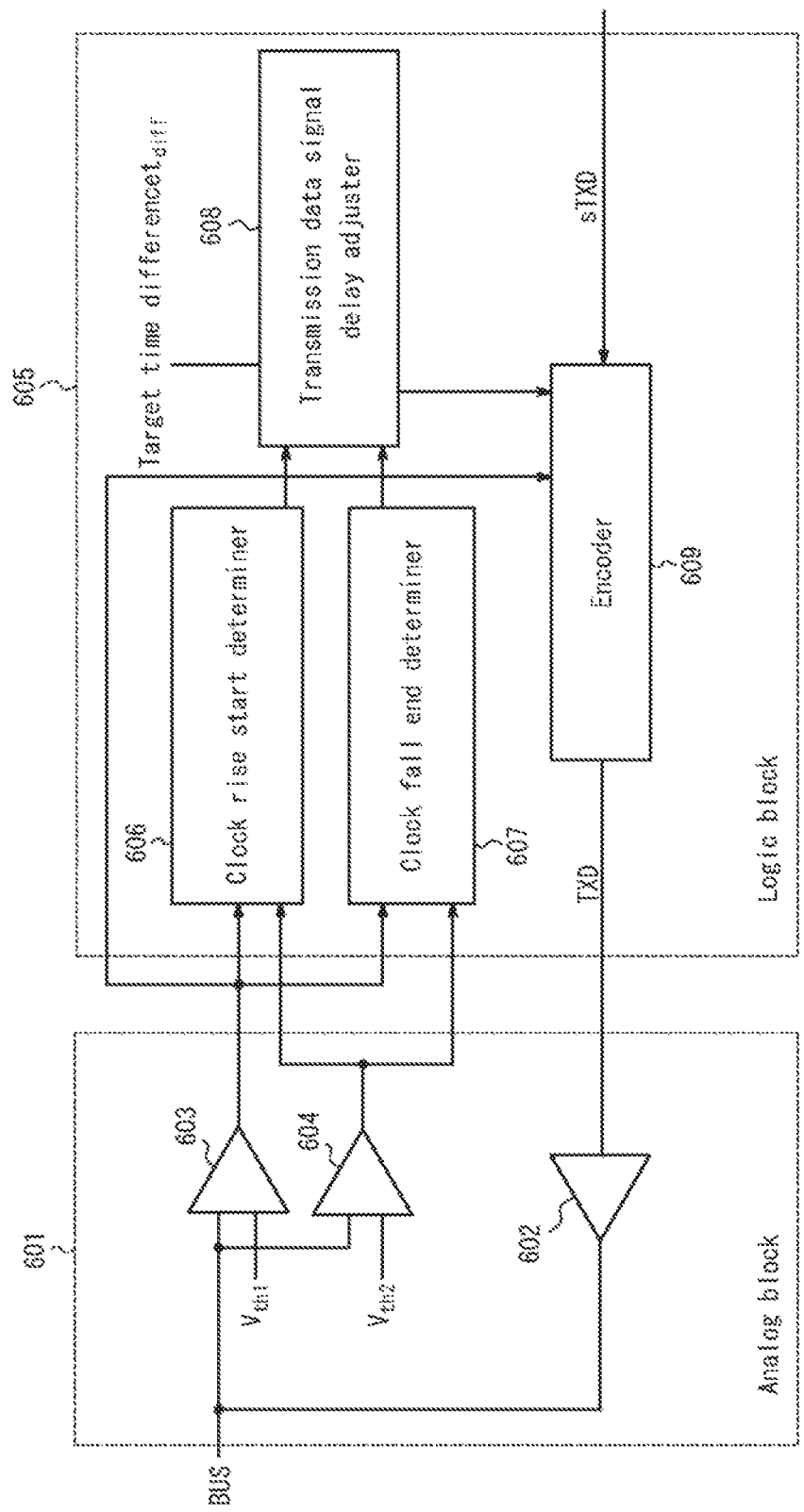
FIG. 6 is a block diagram illustrating an example of a transceiver for communication according to a modification to this embodiment.

FIG. 6 is a block diagram illustrating an example of a transceiver for communication (CXPI transceiver 1506) according to a modification to this embodiment. The CXPI transceiver 1506 according to this modification includes an analog block 601 and a logic block 605.

The analog block 601 includes a driver 602, a first comparator 603, and a second comparator 604. The driver 602 inputs the transmission data signal TXD from the microcontroller 1505, acquired via the logic block 605, into the communication bus 1507.

The first comparator 603 and the second comparator 604 output a signal used in the logic block 605 to determine the time of the clock rise start and the clock fall end. The bus signal mBUS from the communication bus 1507 is input into the first comparator 603 and the second comparator 604. Furthermore, a first reference voltage $V_{th1}$ is input into the first comparator 603, and a second reference voltage $V_{th2}$ is input into the second comparator 604. The first reference voltage $V_{th1}$ and the second reference voltage $V_{th2}$ are each equal to or greater than the voltage $V_L$ of the low level and equal to or less than the voltage $V_H$ of the high level of the bus signal mBUS. It is assumed here that $V_{th1} > V_{th2}$. The first comparator 603 and the second comparator 604 respectively compare the first reference voltage $V_{th1}$ and the second reference voltage $V_{th2}$ with the voltage of the bus signal mBUS and output a signal representing the comparison result (comparison signal).

The logic block 605 includes a clock rise start determiner 606, a clock fall end determiner 607, a transmission data signal delay adjuster 608, and an encoder 609.

The comparison signals from the first comparator 603 and the second comparator 604 are input into the clock rise start determiner 606 and the clock fall end determiner 607. Based on the acquired signal, the clock rise start determiner 606 determines the time $t_2$ at which the bus signal mBUS starts to be displaced from the low level. Based on the acquired signal, the clock fall end determiner 607 determines the time $t_0$ at which the bus signal mBUS reaches the low level. Details on the method by which the clock rise start determiner 606 and the clock fall end determiner 607 determine the time $t_2$ and the time $t_0$ are provided below.

Based on the time $t_2$ acquired from the clock rise start determiner 606, the time $t_0$ acquired from the clock fall end determiner 607, and the target time difference $t_{diff}$, the transmission data signal delay adjuster 608 determines the timing for inputting the transmission data signal TXD. The transmission data signal delay adjuster 608 performs control so that the time $t_1$ of the slave fall end is earlier than the time $t_2$ of the clock rise start by the time difference $t_{diff}$ that allows the desired harmonic level to be reduced. When the time $t_1$ is earlier than the time $t_0$ of the clock fall end, however, conduction noise is generated for the reason described with reference to FIG. 5. In order to avoid this conduction noise, the time $t_1$ of the slave fall end may be controlled to be at or later than the time $t_0$.

The encoder 609 converts the data signal sTXD acquired from the microcontroller 1505 to a PWM signal and inputs the transmission data signal TXD to the driver 602. The encoder 609 inputs the transmission data signal TXD acquired from the microcontroller 1505 to the driver 602 at a predetermined timing based on the timing for inputting the transmission data signal TXD determined by the transmission data signal delay adjuster 608.

Figure 7:
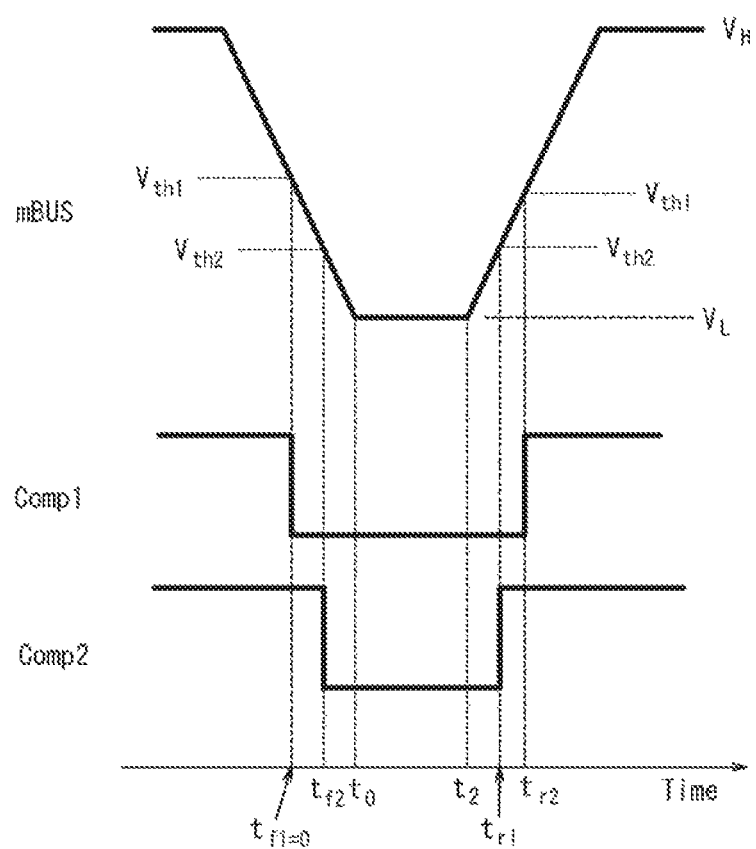
FIG. 7 illustrates a method of determining the time of the rise start and the time of the clock fall end in the transceiver for communication of FIG. 6.

Details on the method by which the clock rise start determiner 606 and the clock fall end determiner 607 determine the time $t_2$ of the clock rise start and the time $t_0$ of the clock fall end are now described with reference to FIG. 7. FIG. 7 illustrates the bus signal mBUS, a comparison signal Comp1 of the first comparator 603, and a comparison signal Comp2 of the second comparator 604.

From the comparison signal Comp1 of the first comparator 603 and the comparison signal Comp2 of the second comparator 604, the clock rise start determiner 606 determines a time $t_{r1}$ at which the bus signal mBUS reached the voltage $V_{th2}$ and a time $t_{r2}$ at which the bus signal mBUS reached the voltage $V_{th1}$ while transitioning from low level to high level. Based on the voltages $V_{th2}$ and $V_{th1}$ of the bus signal mBUS and the times $t_{r1}$ and $t_{r2}$, the clock rise start determiner 606 can calculate the rate of change of the bus signal mBUS. Specifically, the rate of change is calculated as $(V_{th1}-V_{th2})/(t_{r2}-t_{r1})$. Based on the calculated rate of change, the clock rise start determiner 606 calculates the time $t_2$ at which the voltage of the bus signal mBUS is the low level voltage $V_L$. Specifically, the time $t_2$ is calculated by Equation (7) below, where $V_L=0$ and the time $t_{r2}$ is the reference time.

$$t_2 = t_{r2} - t_{r2} - t_{r1}) \cdot V_{th1}/(V_{th1}-V_{th2}) \quad (7)$$

From the comparison signal Comp1 of the first comparator 603 and the comparison signal Comp2 of the second comparator 604, the clock fall end determiner 607 determines a time $t_{f1}$ at which the bus signal mBUS reached the voltage $V_{th1}$ and a time $t_{f2}$ at which the bus signal mBUS reached the voltage $V_{th2}$ while transitioning from high level to low level. Based on the voltages $V_{th1}$ and $V_{th2}$ of the bus signal mBUS and the times $t_{f1}$ and $t_{f2}$, the clock fall end determiner 607 can calculate the rate of change of the bus signal mBUS. Specifically, the rate of change is calculated as $(V_{th2}-V_{th1})/(t_{f2}-t_{f1})$. Based on the calculated rate of change, the clock fall end determiner 607 calculates the time $t_0$ at which the voltage of the bus signal mBUS is the low level voltage $V_L$. Specifically, the time $t_0$ is calculated by Equation (8) below, where $V_L=0$ and the time $t_{f1}$ is the reference time.

$$t_0 = (t_{f2} - t_{f1}) \cdot V_{th1}/(V_{th1}-V_{th2}) \quad (8)$$

The following describes control by the CXPI transceiver 1506 described with reference to FIG. 6. Here, an example of the case of the CXPI transceiver 1506 outputting the bus signal sBUS by transmitting the transmission data signal TXD at the $n^{th}$ clock cycle is described.

First, the CXPI transceiver 1506 determines the time $t_{2\_n}$ of the $n^{th}$ clock rise start with the clock rise start determiner 606. The method for determination of the clock rise start determiner 606 is similar to the method described in FIG. 4. Hence, details are omitted here. When determining the time $t_{2\_n}$, the clock rise start determiner 606 can determine the time of the clock rise start with the method described with reference to FIG. 7.

Figure 8:
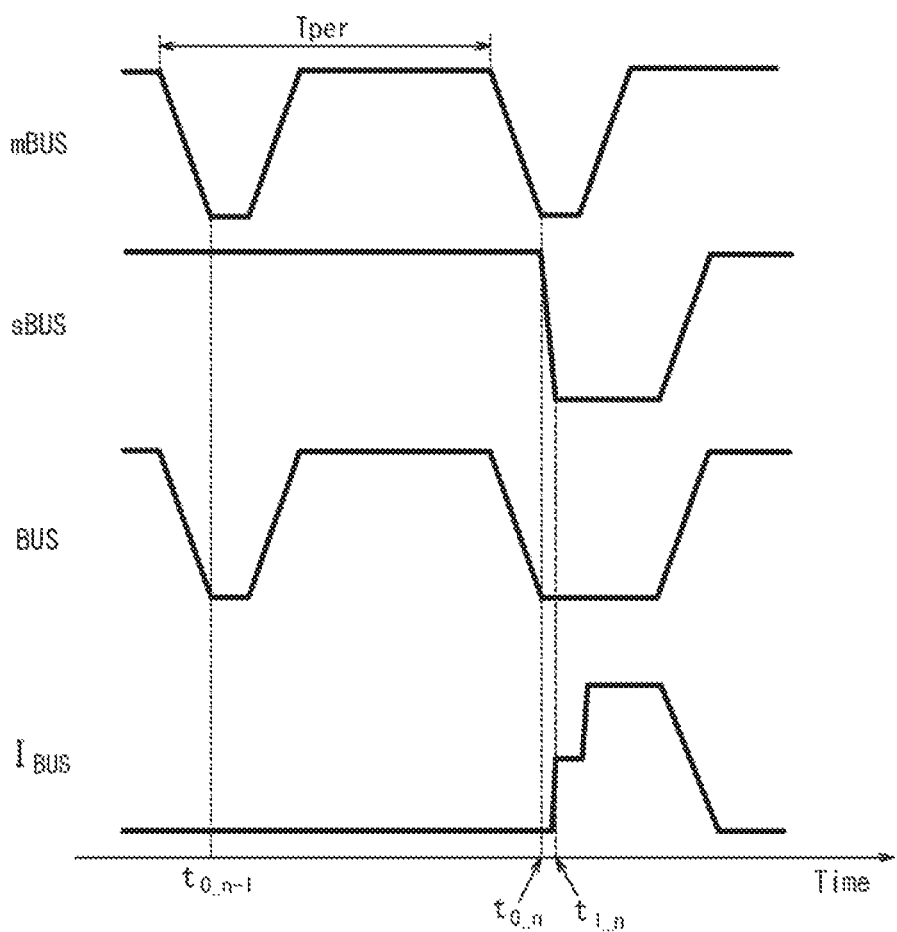
FIG. 8 illustrates processing by the clock fall end determiner in FIG. 6 for determining the time of the clock fall.

Next, with the clock fall end determiner 607, the CXPI transceiver 1506 determines the time $t_{0\_n}$ of the $n^{th}$ clock fall end of the bus signal mBUS. Specifically, as illustrated in FIG. 8, the clock fall end determiner 607 detects the time $t_{0\_n-1}$ of the clock fall end of the bus signal mBUS at the $(n-1)^{th}$ cycle that is one cycle before the $n^{th}$ cycle. The clock fall end determiner 607 detects the time $t_{0\_n-1}$ with the method described with reference to FIG. 7. With the clock fall end determiner 607, the CXPI transceiver 1506 also determines, based on the period $T_{per}$ of the bus signal mBUS, the time $t_{0\_n} = t_{0\_n-1} + T_{per}$ of the $n^{th}$ clock fall end of the bus signal mBUS from the detected time $t_{0\_n-1}$. Note that the CXPI transceiver 1506 need not detect the time $t_{0\_n-1}$ if the time $t_{0\_n}$ of the $n^{th}$ clock fall end of the bus signal mBUS can be calculated. For example, the CXPI transceiver 1506 may calculate the time $t_{0\_n}$ based on the time $t_{0\_n-m}$ of the $(n-m)^{th}$ clock fall end of the bus signal mBUS (where n>m).

The CXPI transceiver 1506 also determines the time of the delay of the transmission data signal TXD with the transmission data signal delay adjuster 608. Details on the method by which the transmission data signal delay adjuster 608 determines the delay time are provided with reference to FIG. 9 and FIG. 10.

Figure 9:
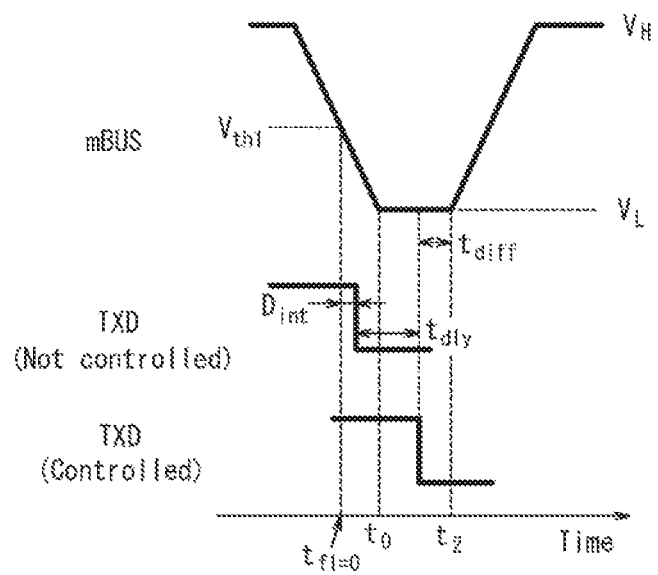
FIG. 9 illustrates an example of a method by which the transmission data signal delay adjuster in FIG. 6 determines the delay time.
Figure 10:
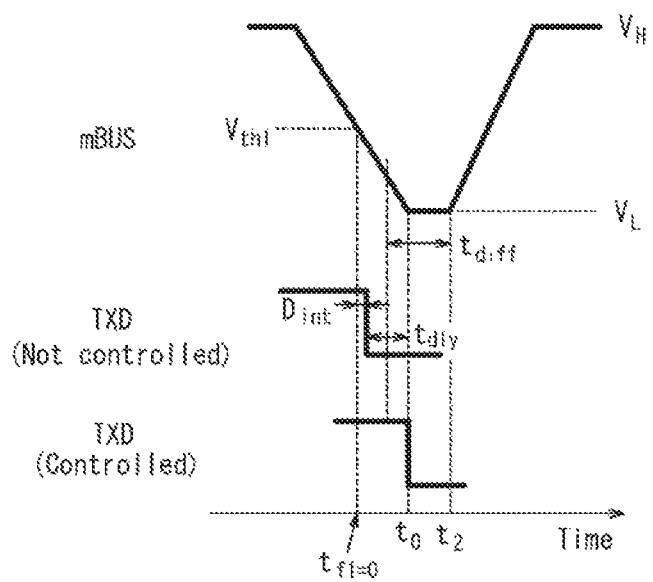
FIG. 10 illustrates an example of a method by which the transmission data signal delay adjuster in FIG. 6 determines the delay time.

FIG. 9 and FIG. 10 illustrate an example of a method by which the transmission data signal delay adjuster in FIG. 6 determines the delay time. FIG. 9 and FIG. 10 illustrate the bus signal mBUS, the transmission data signal TXD (not controlled) when not controlling the timing of output, and the transmission data signal TXD when controlling the timing of output. Here, the time $t_{f1}$ at which the voltage becomes $V_{th1}$ when the bus signal mBUS falls is described as being a reference time.

In FIGS. 9 and 10, $D_{int}$ is a delay value within the circuit and includes a comparator delay, an internal circuit delay, a bus output delay, and the like. Furthermore, $t_{dly}$ is the delay time.

When the time difference $t_{diff}$ is equal to or less than the time between the time $t_2$ and the time $t_0$, i.e. when $t_{diff} \leq t_2 - t_0$, the transmission data signal delay adjuster 608 determines $t_{dly}$ by Equation (9) below.

$$t_{dly} = (t_2 - t_{diff}) - D_{int} \tag{9}$$

FIG. 9 illustrates an example of a state in which Equation (9) holds.

When the time difference $t_{diff}$ is longer than the time between the time $t_2$ and the time $t_0$, i.e. when $t_{diff} > t_2 - t_0$, the transmission data signal delay adjuster 608 determines $t_{dly}$ to be a value satisfying Equation (10) below, where $t_{min} = t_0 - D_{int}$.

$$t_{dly} > t_{min} \tag{10}$$

In this way, when $t_{diff} > t_2 - t_0$, by setting $t_{dly}$ to be a value larger than $t_{min}$, generation of the conduction noise described with reference to FIG. 5 can be avoided.

Figure 11:
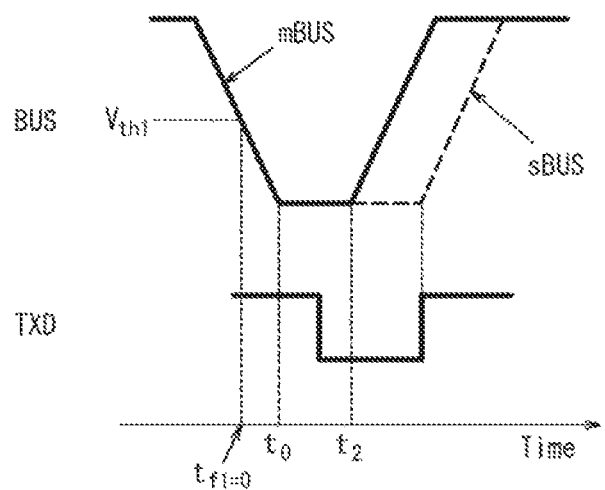
FIG. 11 illustrates a transmission data signal and a bus signal controlled by the decoder in FIG. 6.
Figure 12:
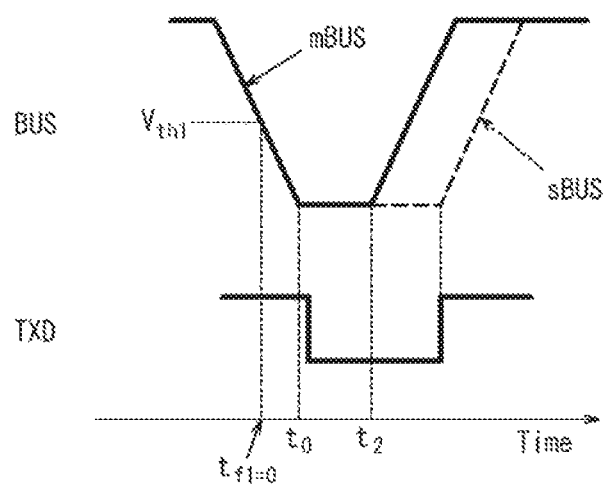
FIG. 12 illustrates a transmission data signal and a bus signal controlled by the decoder in FIG. 6.

With the encoder 609, the CXPI transceiver 1506 controls the transmission data signal TXD based on the calculated delay time $t_{dly}$. FIG. 11 and FIG. 12 illustrate the transmission data signal TXD controlled by the encoder 609 in FIG. 6, and the bus signal BUS yielded by combining the bus signal mBUS and the bus signal sBUS. FIG. 11 illustrates the results of control when $t_{diff} \leq t_2 - t_0$, and FIG. 12 illustrates the results of control when $t_{diff} > t_2 - t_0$.

At the delay time corresponding to $t_{dly}$, the encoder 609 converts the transmission data signal TXD with logical value 0 to a PWM signal and outputs the result. At this time, with respect to the fall of the transmission data signal TXD, the encoder 609 performs control for a time delay corresponding to $t_{dly}$. On the other hand, with respect to the time at which the transmission data signal TXD starts to rise (slave rise start), the encoder 609 performs control so that the length of time from the time $t_{f1}$ is a constant length of time. Assuming that the fall of the bus signal mBUS is constant, the encoder 609 controls the transmission data signal to rise after a constant length of time from the time $t_0$. In this way, the CXPI transceiver 1506 can reduce the harmonic level at a desired frequency band while maintaining the duty cycle of the bus signal BUS.

Figure 13:
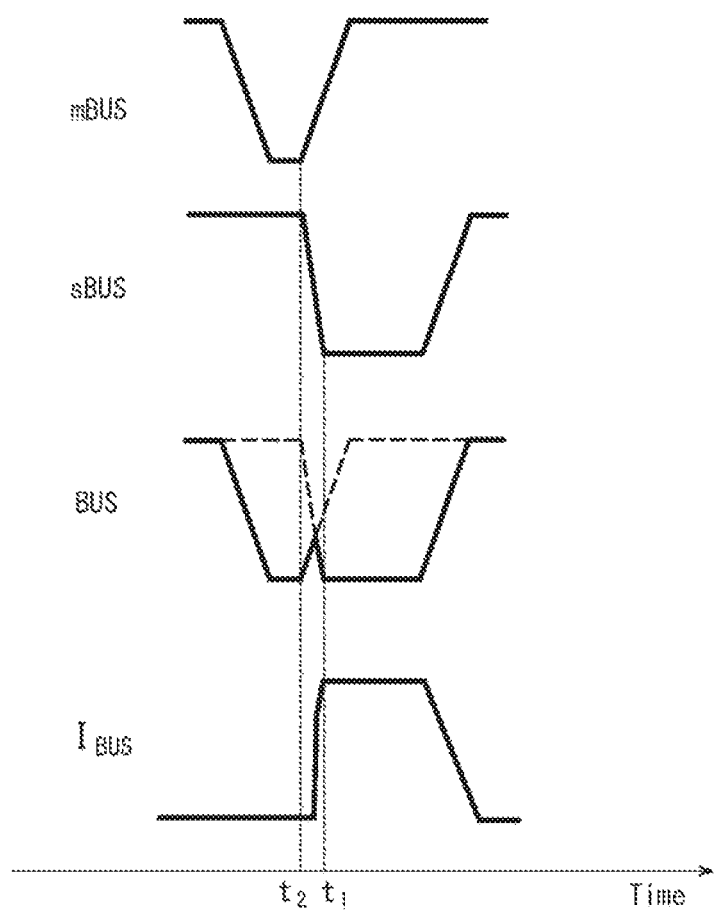
FIG. 13 illustrates the change in current of the communication bus when the rise start is sooner than the slave fall end.

If the time $t_1$ of the slave fall end is later than the time $t_2$ at which the clock signal starts to be displaced from the low level to the high level, then the current flowing in the communication bus 1507 suddenly changes as illustrated in FIG. 13, generating conduction noise. Accordingly, the time $t_1$ should preferably be earlier than the time $t_2$. According to the above-described embodiment and modification, the time $t_1$ is controlled to be earlier than the time $t_2$.

Although embodiments of this disclosure have been described based on examples and on the accompanying drawings, it is to be noted that various changes and modifications will be apparent to those skilled in the art based on this disclosure. Therefore, such changes and modifications are to be understood as included within the scope of this disclosure. For example, the functions and the like included in the structural components may be reordered in any logically coherent way. Furthermore, structural components and the like may be combined into one or divided.

For example, in the above-described embodiment and modification, the encoder may generate a PWM signal, and a timing adjustment circuit provided separately in the CXPI transceiver 1506 may perform control to delay the falling edge of the control signal (slave fall end). In the above-described embodiment and modification, the function of the timing adjustment circuit has been described as being included in the encoder.

The above-described clock rise start determiner 307, transmission data signal delay adjuster 308, clock rise start determiner 606, clock fall end determiner 607, and transmission data signal delay adjuster 608, for example, may be configured as a logic circuit or the like in which a plurality of logic cells are combined. Specific examples include one or more of each of the following: an Application Specific Integrated Circuit (ASIC), Digital Signal Processor (DSP), Digital Signal Processing Device (DSPD), Programmable Logical Device (PLD), Field Programmable Array (FPGA), System-on-Chip (SoC), processor, controller, microcontroller, and microprocessor, or a combination thereof.

Various embodiments described herein may include various operations. These operations may be performed and/or controlled by hardware components, digital hardware and/or firmware, and/or combinations thereof. As used herein, the term "coupled to" may mean coupled directly or indirectly through one or more intervening components. Any of the signals described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a firmware or software product that may include instructions stored on a non-transitory computer-readable medium, e.g., such as volatile memory and/or non-volatile memory. These instructions may be used to program one or more devices that include one or more general-purpose or special-purpose processors (e.g., such as CPUs, ASICs, DSPs, DSPDs, PLDs, FPGAs, SoCs, etc.) or equivalents thereof (e.g., such as processing cores, processing engines, microcontrollers, and the like), so that when executed by the processor(s) or the equivalents thereof, the instructions cause the device(s) to perform the operations described herein. A non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information. A computer-readable medium may also include one or more mechanisms for storing or transmitting information in a form (e.g., software, processing application, etc.) that is readable by a machine (e.g., such as a device or a computer).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A clock extension peripheral interface (CXPI) communication system, comprising:
   a master circuit including a first transceiver, wherein the first transceiver is configured to generate a signal by modulating a timing signal;
   a communication bus; and
   a slave circuit including a second transceiver, wherein the second transceiver further includes;
      a first timing module configured to determine a first time based on a timing at which the signal received through the communication bus from the master circuit is detected to have started rising from a low level to a high level;
      a timing adjustment module configured to determine a second time based on the first time and a predetermined time difference value; and
      an encoder configured to extend a length of time of a combined signal on the communication bus is at the low level by pulling a data signal to be output to the master circuit through the communication bus from the high level to the low level at the second time.

2. The CXPI communication system of claim 1, wherein the timing adjustment module computes the predetermined time difference value based on a frequency at which a harmonic level is reduced and a natural number.

3. The CXPI communication system of claim 1, wherein the second time is generated by subtracting the predetermined time difference value from the first time.

4. The CXPI communication system of claim 1, wherein the slave circuit further comprises:
   a second timing module configured to determine a third time based on a timing at which the signal received through the communication bus from the master circuit is detected to have started falling from the high level to the low level.

5. The CXPI communication system of claim 4, wherein the second time is later than the third time and earlier than the first time.

6. The CXPI communication system of claim 1, wherein the slave circuit further comprises a clock rise detector configured to detect a rising edge of the signal received through the communication bus from the master circuit.

7. The CXPI communication system of claim 4, wherein the slave circuit further comprises:
   a first comparator configured to generate a first result based on a voltage level of the signal received through the communication bus from the master circuit and a first reference voltage; and
   a second comparator configured to generate a second result based on the voltage level of the signal received through the communication bus from the master circuit and a second reference voltage, wherein the high level is greater than the first reference voltage, the first reference voltage is greater than the second reference voltage, and the second reference voltage is greater than the low level.

8. The CXPI communication system of claim 7, wherein the first and second timing modules, based on the first and second results, respectively determine the first time and the third time.

9. The CXPI communication system of claim 1, wherein the signal is a Pulse Width Modulation (PWM) signal.

10. The CXPI communication system of claim 1 is disposed in an automobile electronic control system.

11. A method of operating a clock extension peripheral interface (CXPI) communication system, comprising:
   generating a signal by modulating a timing signal from a master circuit of the CXPI communication system;
   transmitting the signal to a slave circuit through a communication bus;
   detecting a change from a low level to a high level of the signal;
   generating a second time based on a first time and a predetermined time difference value, wherein the signal is detected to be changing from the low level to the high level at the first time; and
   extending the low level of a combined signal on the communication bus by pulling a data signal to be output, from the slave circuit to the master circuit, on the communication bus from the high level to the low level, wherein the data signal is pulled to the low level at the second time.

12. The method of claim 11, wherein the predetermined time difference is computed based on a frequency at which a harmonic level is reduced and a natural number.

13. The method of claim 11, wherein generating the second time further comprising:
   computing the second time by subtracting the predetermined time difference from the first time.

14. The method of claim 11, further comprising:
   generating a third time based on a timing at which the signal received through the communication bus from the master circuit is detected to have started falling from the high level to the low level.

15. The method of claim 14, wherein the second time is later than the third time and earlier than the first time.

16. The method of claim 11, further comprising:
   detecting a rising edge of the signal received through the communication bus, by a clock rise detector.

17. The method of claim 14, further comprising:
   generating a first result, by a first comparator, based on a voltage level of the signal received through the communication bus from the master circuit and a first reference voltage; and
   generating a second result, by a second comparator, based on the voltage level of the signal received through the communication bus from the master circuit and a second reference voltage, wherein the high level is greater than the first reference voltage, the first reference voltage is greater than the second reference voltage, and the second reference voltage is greater than the low level.

18. The method of claim 17, further comprising:
   determining the first and third times based on the first and second results.

19. The method of claim 11, wherein the signal is a Pulse Width Modulation (PWM) signal.

20. The method of claim 11, wherein the master and slave circuits are disposed in an automobile electronic control system.

* * * * *